United States Patent
Tonomura

(12) 
(10) Patent No.: US 6,223,195 B1
(45) Date of Patent: *Apr. 24, 2001

(54) DISCRETE COSINE HIGH-SPEED ARITHMETIC UNIT AND RELATED ARITHMETIC UNIT

(75) Inventor: Motonobu Tonomura, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/460,766

(22) Filed: Dec. 14, 1999

Related U.S. Application Data

(63) Continuation of application No. 08/737,569, filed as application No. PCT/JP95/00953 on May 18, 1995, now Pat. No. 6,029,185.

(30) Foreign Application Priority Data

| | | | |
|---|---|---|---|
| May 27, 1994 | (JP) | ................................................... | 6-114924 |
| Aug. 29, 1994 | (JP) | ................................................... | 6-203188 |
| Aug. 29, 1994 | (JP) | ................................................... | 6-203189 |

(51) Int. Cl.$^7$ ............................. G06F 17/14; G06F 7/38; G06F 7/00
(52) U.S. Cl. ......................... 708/402; 708/603; 708/493
(58) Field of Search .................................. 708/400–410, 708/603

(56) References Cited

U.S. PATENT DOCUMENTS

| | | |
|---|---|---|
| 4,791,598 | 12/1988 | Liou et al. . |
| 5,249,146 | 9/1993 | Uramoto et al. . |
| 5,357,453 | 10/1994 | Kim et al. . |
| 5,477,469 | 12/1995 | Motomura . |
| 5,598,361 | 1/1997 | Nagamatsu et al. . |
| 5,737,256 | 4/1998 | Nakagawa et al. . |

FOREIGN PATENT DOCUMENTS

| | | |
|---|---|---|
| 60-218168 | 10/1985 | (JP) . |
| 2-125366 | 5/1990 | (JP) . |
| 3-35353 | 2/1991 | (JP) . |
| 5-20457 | 1/1993 | (JP) . |
| 5-268481 | 10/1993 | (JP) . |

OTHER PUBLICATIONS

Potkonjak et al., "Efficient Substitution of Multiple Constant Multiplications by Shifts and Additions Using Iterative Pairwise Matching", 31$^{st}$ Design Automation Conference, San Diego, CA, Proceedings 1994, Jun. 6–10, 1994, pp. 189–194.

Japanese Journal, "Nikkei Electronics", No. 511, Oct. 15, 1990, pp. 115–142.

Technical Report of The Institute of Electronics, Information and Communication Engineers, Sep. 1994, pp. 39–46.

IEICE Transactions on Fundamentals of Electronics, Communications and Computer Sciences, vol. E78–A, No. 8, Aug. 1995, pp. 957–962.

Transactions of Information Processing Society of Japan, vol. 31, No. 8 (Tokyo), Oct. 15, 1993, pp. 1242–1250.

*Primary Examiner*—Tan V. Mai
(74) *Attorney, Agent, or Firm*—Antonelli, Terry, Stout & Kraus, LLP

(57) ABSTRACT

This arithmetic unit for carrying out partial sum of products for transform operations such as discrete cosine transform is provided which includes a plurality of first units for calculating in parallel sums of and/or differences between a plurality of input variables or sums of and/or differences between a plurality of values obtained by multiplying said plurality of input variables by a constant. The arithmetic unit also includes a processing unit having a plurality of shift units for shifting outputs from said plurality of first units by respectively predetermined numbers of digit-shifts and a plurality of second units for calculating concurrently sums of outputs from said plurality of shift units. The arithmetic can be used, for example, as a high speed discrete cosine unit, a high speed Hartley transform unit or a high speed Hough transform unit.

18 Claims, 17 Drawing Sheets

FIG.3

| g | θ : rad | √2 * cos θ : 16-DIGIT/RECODED VALUE (46→43) | cos θ : 16-DIGIT/RECODED VALUE (59→42) |
|---|---|---|---|
| g(1) | π/16 | 01.0110001100010101<br>10.$\bar{1}$0$\bar{1}$0010$\bar{1}$00010101 | 0.1111101100010101<br>1.000000$\bar{1}$0$\bar{1}$00010101 |
| g(2) | 2π/16 | 01.0100111001111010<br>01.01010010100$\bar{1}$010 | 0.11101100100000$\bar{1}\bar{1}$<br>1.000$\bar{1}$0$\bar{1}$001000010$\bar{1}$ |
| g(3) | 3π/16 | 01.0010110100000110<br>01.010$\bar{1}$0$\bar{1}$0100001010 | 0.110101001101101$\bar{1}$<br>1.0$\bar{1}$0101010010010$\bar{1}$ |
| g(4) | 4π/16 | 01.0000000000000000<br>01.0000000000000000 | 0.10110101000001$0$1<br>1.0$\bar{1}$010101000001$0$1 |
| g(5) | 5π/16 | 00.1100100100100011<br>01.0$\bar{1}$00100100100$\bar{1}$0$\bar{1}$ | 0.100011100011101$0$<br>0.100100$\bar{1}$00100$\bar{1}$010 |
| g(6) | 6π/16 | 00.1000101010001011<br>00.10001010100$\bar{1}$0$\bar{1}$0$\bar{1}$ | 0.0110000111111000<br>0.10$\bar{1}$0001000001$\bar{1}$000 |
| g(7) | 7π/16 | 00.0100011010100001<br>00.010010$\bar{1}$010100001 | 0.0011000111110001<br>0.010$\bar{1}$001000010$\bar{1}$0001 |

REDUNDANT BINARY ADDER

FIG. 10

DCT $$X = F \times F^t = \begin{bmatrix} f(2) & f(2) & f(2) & f(2) \\ f(1) & f(3) & -f(3) & -f(1) \\ f(2) & -f(2) & -f(2) & f(2) \\ f(3) & -f(1) & f(1) & -f(3) \end{bmatrix} \begin{bmatrix} x_{00} & x_{01} & x_{02} & x_{03} \\ x_{10} & x_{11} & x_{12} & x_{13} \\ x_{20} & x_{21} & x_{22} & x_{23} \\ x_{30} & x_{31} & x_{32} & x_{33} \end{bmatrix} \begin{bmatrix} f(2) & f(1) & f(2) & f(3) \\ f(2) & f(3) & -f(2) & -f(1) \\ f(2) & -f(3) & -f(2) & f(1) \\ f(2) & -f(1) & f(2) & -f(3) \end{bmatrix}$$

$$= \begin{bmatrix} f(2)f(2)u_{00} & f(2)f(3)u_{01}+f(1)f(2)v_{01} & f(2)f(2)u_{02} & f(2)f(3)v_{01}-f(1)f(2)u_{01} \\ f(2)f(3)u_{00}+f(1)f(2)v_{10} & f(3)f(3)u_{11}+f(1)f(3)v_{11}+f(1)f(1)w_{11} & f(2)f(3)u_{12}+f(1)f(2)v_{12} & f(3)f(3)u_{13}+f(1)f(3)v_{13}+f(1)f(3)w_{13} \\ f(2)f(2)u_{20} & f(2)f(3)u_{21}+f(1)f(2)v_{21} & f(2)f(2)u_{22} & f(2)f(3)v_{21}-f(1)f(2)u_{21} \\ f(2)f(3)v_{10}-f(1)f(2)u_{10} & f(1)f(3)w_{13}-f(3)f(3)v_{13}-f(1)f(1)u_{13} & f(2)f(3)v_{12}-f(1)f(2)u_{12} & f(3)f(3)w_{11}+f(1)f(3)u_{11}-f(1)f(3)v_{11} \end{bmatrix}$$

IDCT $$x = F^t X F = \begin{bmatrix} f(2) & f(1) & f(1) & f(3) \\ f(2) & f(3) & -f(2) & -f(1) \\ f(2) & -f(3) & -f(2) & f(1) \\ f(2) & -f(1) & f(2) & -f(3) \end{bmatrix} \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \begin{bmatrix} f(2) & f(2) & f(2) & f(2) \\ f(1) & f(3) & -f(3) & -f(1) \\ f(2) & -f(2) & -f(2) & f(2) \\ f(3) & -f(1) & f(1) & -f(3) \end{bmatrix}$$

$$x = \{f(1)f(1)[\underbrace{\phantom{xx}}_{40}] + f(2)f(2)[\underbrace{\phantom{xx}}_{41}] + f(3)f(3)[\underbrace{\phantom{xx}}_{42}] + f(1)f(3)[\underbrace{\phantom{xx}}_{43}] \} + \{f(1)f(2)[\underbrace{\phantom{xx}}_{44}] + f(2)f(3)[\underbrace{\phantom{xx}}_{45}] \}$$

$$f(1)f(1) \begin{bmatrix} X_{11} & -X_{13} & X_{13} & -X_{11} \\ -X_{32} & X_{33} & -X_{33} & X_{31} \\ X_{31} & -X_{33} & X_{33} & -X_{31} \\ -X_{11} & X_{13} & -X_{13} & X_{11} \end{bmatrix} \sim 40$$

$$f(3)f(3) \begin{bmatrix} X_{33} & X_{31} & -X_{31} & -X_{33} \\ X_{13} & X_{11} & -X_{11} & -X_{13} \\ -X_{13} & -X_{11} & X_{11} & X_{13} \\ -X_{33} & -X_{31} & X_{31} & X_{33} \end{bmatrix} \sim 42$$

$$f(1)f(3) \begin{bmatrix} X_{13}+X_{31} & X_{11}-X_{33} & -X_{11}+X_{33} & -X_{13}-X_{31} \\ X_{11}-X_{33} & -X_{13}-X_{31} & X_{13}+X_{31} & -X_{11}+X_{33} \\ -X_{11}+X_{33} & X_{13}+X_{31} & -X_{13}-X_{31} & X_{11}-X_{33} \\ -X_{13}-X_{31} & -X_{11}+X_{33} & X_{11}-X_{33} & X_{13}+X_{31} \end{bmatrix} \sim 43$$

$$f(2)f(2) \begin{bmatrix} X_{00}+X_{02}+X_{20}+X_{22} & X_{00}-X_{02}+X_{20}-X_{22} & X_{00}-X_{02}+X_{20}-X_{22} & X_{00}+X_{02}+X_{20}+X_{22} \\ X_{00}+X_{02}-X_{20}-X_{22} & X_{00}-X_{02}-X_{20}+X_{22} & X_{00}-X_{02}-X_{20}+X_{22} & X_{00}+X_{02}-X_{20}-X_{22} \\ X_{00}+X_{02}-X_{20}-X_{22} & X_{00}-X_{02}-X_{20}+X_{22} & X_{00}-X_{02}-X_{20}+X_{22} & X_{00}+X_{02}-X_{20}-X_{22} \\ X_{00}+X_{02}+X_{20}+X_{22} & X_{00}-X_{02}+X_{20}-X_{22} & X_{00}-X_{02}+X_{20}-X_{22} & X_{00}+X_{02}+X_{20}+X_{22} \end{bmatrix}$$ 41, 44

$$f(1)f(2) \begin{bmatrix} X_{01}+X_{10}+X_{12}+X_{21} & -X_{03}+X_{10}-X_{12}-X_{23} & X_{03}+X_{10}-X_{12}+X_{23} & -X_{01}+X_{10}+X_{12}-X_{21} \\ X_{01}-X_{21}-X_{30}-X_{32} & -X_{03}+X_{23}-X_{30}+X_{32} & X_{03}-X_{23}-X_{30}+X_{32} & -X_{01}+X_{21}-X_{30}-X_{32} \\ X_{01}-X_{21}+X_{30}+X_{32} & -X_{03}+X_{23}+X_{30}-X_{32} & X_{03}-X_{23}+X_{30}-X_{32} & -X_{01}+X_{21}+X_{30}+X_{32} \\ X_{01}-X_{10}-X_{12}+X_{21} & -X_{03}-X_{10}+X_{12}-X_{23} & X_{03}-X_{10}+X_{12}+X_{23} & -X_{01}-X_{10}-X_{12}-X_{21} \end{bmatrix}$$ 45

$$f(2)f(3) \begin{bmatrix} X_{03}+X_{23}+X_{30}+X_{32} & X_{01}+X_{21}+X_{30}-X_{32} & -X_{01}-X_{21}+X_{30}-X_{32} & -X_{03}-X_{23}+X_{30}+X_{32} \\ X_{03}+X_{10}+X_{12}-X_{23} & X_{01}+X_{10}-X_{12}-X_{21} & -X_{01}+X_{10}-X_{12}+X_{21} & -X_{03}+X_{10}+X_{12}+X_{23} \\ X_{03}-X_{10}-X_{12}-X_{23} & X_{01}-X_{10}+X_{12}-X_{21} & -X_{01}-X_{10}+X_{12}+X_{21} & -X_{03}-X_{10}+X_{12}+X_{23} \\ X_{03}+X_{23}-X_{30}-X_{32} & X_{01}+X_{21}-X_{30}+X_{32} & -X_{01}-X_{21}-X_{30}+X_{32} & -X_{03}-X_{23}-X_{30}-X_{32} \end{bmatrix}$$

$$\begin{bmatrix}X_0\\X_1\\X_2\\X_3\\X_4\\X_5\\X_6\\X_7\\X_8\\X_9\\X_{10}\\X_{11}\\X_{12}\\X_{13}\\X_{14}\\X_{15}\end{bmatrix} = \begin{bmatrix}1 & 1 & 1 & 1 & 1 & 1 & 1 & 1 & 1 & 1 & 1 & 1 & 1 & 1 & 1 & 1\\1 & p & p\sqrt{2} & p & 1 & q & 0 & q & -1 & -p & -p\sqrt{2} & -p & -1 & -q & 0 & -q\\1 & \sqrt{2} & 1 & 0 & -1 & -\sqrt{2} & -1 & 0 & 1 & \sqrt{2} & 1 & 0 & -1 & -\sqrt{2} & -1 & 0\\1 & p & 0 & -p & -1 & -q & \sqrt{2} & -q & -1 & -p & 0 & p & 1 & q & -\sqrt{2} & q\\1 & 1 & -1 & -1 & 1 & 1 & -1 & -1 & 1 & 1 & -1 & -1 & 1 & 1 & -1 & -1\\1 & q & -\sqrt{2} & q & 1 & -p & 0 & -p & -1 & -q & \sqrt{2} & -q & -1 & p & 0 & p\\1 & 0 & -1 & \sqrt{2} & -1 & 0 & 1 & -\sqrt{2} & 1 & 0 & -1 & \sqrt{2} & -1 & 0 & 1 & -\sqrt{2}\\1 & q & p\sqrt{2} & -p & 1 & q & 0 & q & -1 & q & -p\sqrt{2} & p & -1 & -q & 0 & -q\\1 & -1 & 1 & -1 & 1 & -1 & 1 & -1 & 1 & -1 & 1 & -1 & 1 & -1 & 1 & -1\\1 & -q & 0 & q & -1 & p & \sqrt{2} & p & 1 & -q & 0 & q & -1 & p & -\sqrt{2} & p\\1 & -\sqrt{2} & 1 & 0 & -1 & \sqrt{2} & -1 & 0 & 1 & -\sqrt{2} & 1 & 0 & -1 & \sqrt{2} & -1 & 0\\1 & -p & 0 & p & -1 & q & \sqrt{2} & q & -1 & p & 0 & -p & 1 & -q & -\sqrt{2} & -q\\1 & -1 & -1 & 1 & 1 & -1 & -1 & 1 & 1 & -1 & -1 & 1 & 1 & -1 & -1 & 1\\1 & -q & \sqrt{2} & -q & 1 & p & 0 & -p & -1 & q & -\sqrt{2} & q & -1 & -p & 0 & p\\1 & 0 & -1 & -\sqrt{2} & -1 & 0 & 1 & \sqrt{2} & 1 & 0 & -1 & -\sqrt{2} & -1 & 0 & 1 & \sqrt{2}\\1 & -p & p\sqrt{2} & p & -1 & q & 0 & -q & -1 & p & -p\sqrt{2} & -p & 1 & -q & 0 & q\end{bmatrix}\begin{bmatrix}x_0\\x_1\\x_2\\x_3\\x_4\\x_5\\x_6\\x_7\\x_8\\x_9\\x_{10}\\x_{11}\\x_{12}\\x_{13}\\x_{14}\\x_{15}\end{bmatrix}$$

$$p = \cos\frac{\pi}{8} + \cos\frac{3\pi}{8}, \quad q = \cos\frac{\pi}{8} - \cos\frac{3\pi}{8}$$

REDUNDANT BINARY ADDER WITH x ± y SIMULTANEOUS OUTPUT (i-th DIGIT)

|  | 0 . 1 2 3 4 5 6 7 8 9 a b c d e f g |
|---|---|
| $\cos(\pi/16)$ | 1 . 0 0 0 0 0 $\bar{1}$ 0 /$\bar{1}$/ 0 0 0 |1| 0 1 0 |1| |
| $\cos(7\pi/16)$ | 0 . 0 1 0 $\bar{1}$ 0 0 /1/ 0 0 0 0 |$\bar{1}$| 0 0 0 |1| |
| $\cos(2\pi/16)$ | 1 . 0 0 0/$\bar{1}$/0 $\bar{1}$\0 0 1 0 0 0 0/$\bar{1}$/0 $\bar{1}$ |
| $\cos(6\pi/16)$ | 0 . 0 1/1/0 0 0\1\0 0 0 0 0/1/0 0 0 |
| $\cos(3\pi/16)$ | 0 . |1| 1 0 |1| 0 1 0/$\bar{1}$/0 0/$\bar{1}$/0 0 |$\bar{1}$|0/$\bar{1}$/ |
| $\cos(5\pi/16)$ | 0 . |1| 0 0 |1| 0 0/$\bar{1}$/0 0/1/0 0 0 |1 1|0 |
| $\cos(4\pi/16)$ | 1 . 0 $\bar{1}$ 0 $\bar{1}$ 0 1 0 1 0 0 0 0 0 1 0 1 |

DISCRETE COSINE HIGH-SPEED ARITHMETIC UNIT AND RELATED ARITHMETIC UNIT

CROSS-REFERENCE TO RELATED APPLICATION

This application is a continuation of application Ser. No. 08/737,569, filed on Nov. 15, 1996, U.S. Pat. No. 6,029,185, the entire disclosure of which is a 371 of PCT/JP95/00953 filed May 18, 1995.

TECHNICAL FIELD

The present invention relates to an arithmetic unit of a computer system, and in particular, to a discrete cosine high-speed arithmetic unit suitable for achieving calculation of a sum of products using a plurality of constant function values and compressing and decompressing data at a high speed. Moreover, the present invention relates to a high-speed Hartley transform arithmetic unit suitable for calculating a sum of products using a plurality of constant function values and thereby executing the Hartley transform processing, which is related to a Fourier transform, at a high speed. Additionally, the present invention relates to image processing, and in particular, to a Hough transform circuit to achieve a Hough transform in which straight line components of an image are detected, the circuit being suitable for calculating a sum of products using a plurality of constant function values and executing the Hough transform processing at a high speed.

BACKGROUND ART

In voice and image processing, there has been widely employed a discrete Fourier transform (DFT) and its variations such as a discrete cosine transform and a discrete Hartley transform. In these transform processes, a plurality of trigonometric functions are utilized to primarily calculate sums of products between the trigonometric functions and data items. In general, the calculation cost of multiplication is higher than that of addition and subtraction. Consequently, there have been devised several high-speed calculation algorithms in which the number of multiplications are advantageously reduced using relationships between trigonometric functions, e.g., the formula of double angle and the formula of half-angle. These algorithms have been briefly described in pages 115 to 142 of the "Nikkei Electronics" No. 511 published on October 15, 1990. In practice, the trigonometric functions are stored as constants in a memory. Particularly, due to the relatively small number of figures of the values, there has been also adopted a method in which the results of products between data items and trigonometric functions are stored in a memory. In addition, it is possible to utilize a known method in which each trigonometric function value is calculated in a CORDIC method using the principle of rotation of coordinates and/or a formula of approximate expression of function.

In image processing, the Hough transform is often employed because the transform is advantageously applicable even when the data contains noises due to the detection of straight lines in the image. When the coordinates of an arbitrary pixel are expressed as (x,y), the Hough transform is defined as $$R = x \cos \theta + y \sin \theta = x \cos \theta + y \cos(\pi/2 - \theta).$$

FIG. 23 shows the geometric relationship of the transform. R stands for the length of a perpendicular drawn from the origin of the coordinate system to a straight line passing the pixel (x,y). Letter $\theta$ denotes the angle between the perpendicular and the positive direction of the x axis. In an actual application, for an arbitrary pixel, the angle $\theta$ takes a plurality of discrete values ranging from 0 to $\pi$ such that R of expression (1) is calculated for each value of $\theta$. R is also discretized and its frequency of occurrence is attained in the form of voting for all pixels so that (R, $\theta$) having the highest number of votes obtained is detected as a straight line component.

A plurality of trigonometric functions are stored as constants in a memory for use in calculation later. Or, in the conventional method in which the value of each trigonometric function is directly calculated using, e.g., the CORDIC method, even when the number of multiplications is reduced by a clever algorithm, a considerable amount of multiplications are still necessary. Furthermore, it is not practical to provide a multiplier for each of the multiplications, namely, the multiplier is to be sequentially used. This is cause of hindrance to the high-speed operation. Additionally, since an arbitrary input is assumed in a multiplier, even when a value at a digit place of binary input data is zero, a partial product is uselessly calculated for the digit place. When there is used the method in which all of the results of products between data items and trigonometric function values are stored in the memory, although the arithmetic unit can be easily designed, the memory capacity is increased and hence the chip size becomes larger.

Moreover, to count the votes for the discrete (R, $\theta$), there is required a large volume of memory.

DISCLOSURE OF INVENTION

It is therefore an object of the present invention to provide a discrete cosine high-speed arithmetic unit, a high-speed Hartley transform arithmetic unit, and a high-speed Hough transform circuit in which considering that each trigonometric function value is constant, to possibly minimize the number of non-zero coefficients in the binary value obtained by expanding the trigonometric function value, the value is beforehand recoded into a redundant binary representation of $\{-1,0,+1\}$. The resultant values are shifted such that a pair of non-zero coefficients is optimally grouped. For each digit position, associated data pairs are subjected to addition or subtraction according to the signs of the coefficients. Moreover, the resultant values are shifted to be aligned to a fixed position and are then inputted to a group of adders to thereby obtain partial products therebetween, thereby attaining the sum of the partial products. In consequence, the arithmetic units and circuit above are efficiently configured in a compact structure to operate at a high speed.

Since the number of non-zero coefficients is reduced in the constant and the pair of non-zero coefficient values are grouped for each digit position to commonly effect the addition in an optimal manner, the number of adders is decreased and the number of stages of gates is also minimized.

BRIEF DESCRIPTION OF DRAWINGS

FIG. 3 is a table showing binary expansion values of seven cosine constants, values obtained by canonically recoding the expansion values, and values attained by multiplying the values by the square root of two.

FIG. 4 is a diagram showing a combination of variable pairs to beforehand accomplish addition or subtraction for the anterior addition and shift input positions for the posterior addition.

FIG. 10 is a DCT at two-dimensional 4×4 points in matrix representation.

FIG. 11 is an IDCT at two-dimensional points 4×4 in matrix representation.

FIG. 12 is a diagram showing a method in which the DCT/IDCT at two-dimensional 4×4 points is directly calculated without reducing the two-dimensional form into a one-dimensional form and a combination of pairs of variables to beforehand accomplish addition or subtraction for the anterior addition and shift input positions for the posterior addition.

FIG. 16 is an explanatory diagram showing a 16-point Hartley transform in matrix representation.

FIG. 17 is an explanatory diagram showing a re-arranged 16-point Hartley transform in matrix representation.

BEST MODE FOR CARRYING OUT THE INVENTION

A description will first be given of an 8-point discrete cosine transform (to be abbreviated as DCT herebelow). Assuming that input data and calculation data are respectively $x_k$ and $X_n$, the formula of DCT is expressed as follows:

$$X_n = c_n \sum_{k=0}^{7} x_k \cdot \cos \frac{\pi n(2k+1)}{16} \tag{1}$$

Moreover, the formula of inverse DCT (to be abbreviated as IDCT herebelow) is expressed as:

$$x_k = c_n \sum_{n=0}^{7} c_n X_n \cdot \cos \frac{\pi n(2k+1)}{16} \tag{2}$$

where, $$c_0 = 1/2\sqrt{2}, \quad c_n = 1/2 \ldots n \neq 0 \tag{3}$$

Figures 1, 2:
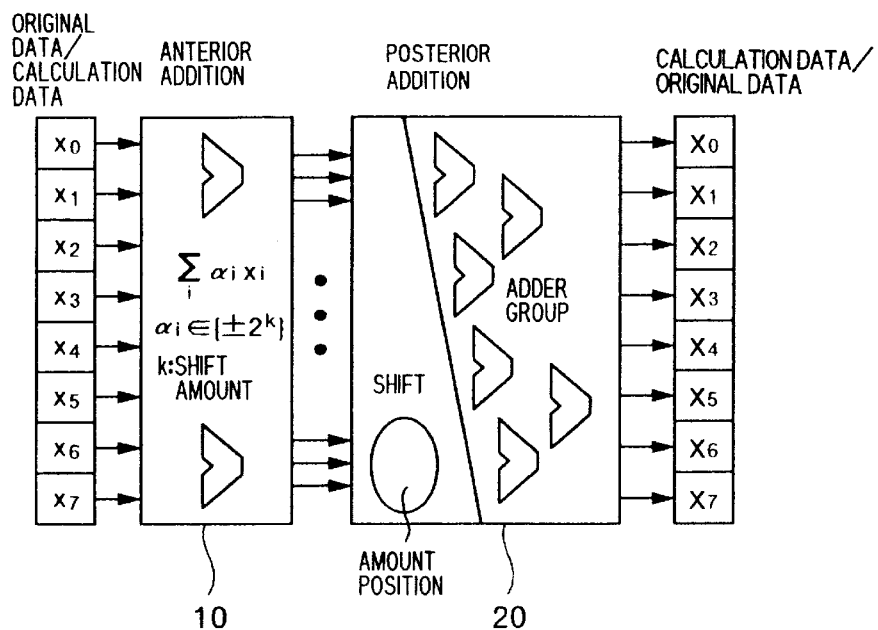
FIG. 1 is a configuration diagram of a discrete cosine high-speed arithmetic unit of the present invention.
FIG. 2 is a DCT/IDCT calculation expressed in matrix form.

It is assumed $g(i) = \cos(\pi i/16)$, equation (1) can be represented in matrix equation as shown in FIG. 2. Additionally, equation (2) can be represented as a matrix attained by transposing the rows and columns of the matrix in FIG. 2.

Prior to conducting the DCT calculation, consider now the following formula of product sum:

$$X = \sum_{k=1}^{n} x_k a_k \tag{4}$$

Assuming:

$$a_k = \sum_{i=0}^{m-1} a_{k,i} 2^i \tag{5}$$

in equation (4), the following relationship results:

$$X = \sum_{k=1}^{n} x_k a_k = \sum_{k=1}^{n} x_k \cdot \left( \sum_{i=0}^{m-1} a_{k,i} 2^i \right) \tag{6}$$

where, $a_{k,1} \in \{-1, 0, 30\ 1\}$. If there exist a pair of coefficients $a_{k,i}$ and $a_{j,i}$ having a relationship of $a_{k,i} = |a_{j,i}| = 1$ for distinct k and j, then the following equation is obtained:

$$(x_k a_{k,i} + x_j a_{j,i}) 2^i = (x_k \pm x_j) 2^i \tag{7}$$

Furthermore, if there exist a pair of coefficients $a_{k,i}$ and $a_{j,m}$ having a relationship of $a_{k,i} = |a_{j,m}| = 1$ for distinct i and m, the following equation results.

$$(x_k a_{k,i} + x_j a_{j,m} \cdot 2^{m-i}) 2^i = (x_k \pm x_j \cdot 2^{m-i}) 2^i \tag{8}$$

For the product sum $x_k \cdot a_k + x_j \cdot a_j$, if there exist a plurality of pairs of coefficients satisfying equation (7) or (8), the sums of and differences between $x_k$ and $x_j$ are calculated according to the principle represented by equation (7) and the sums of and differences between one of $x_k$ and $x_j$ and results obtained by multiplying the other one thereof by n-th power of two (n=(m−i) digit shift) are calculated according to the principle designated by equation (8), and then the obtained results are respectively shifted to digit positions to satisfy the condition above to be then added to each other, thereby reducing the number of calculations for the partial product sum.

In addition, appropriately using a relationship $$2^i - 2^0 = 2^{i-1} + 2^{i-2} + \ldots + 2^0 \tag{9}$$

called a canonical recode in which the i non-zero coefficients can be decreased to two non-zero coefficients, there are conducted shift operations to thereby increase the pairs of coefficients satisfying equation (7) or (8).

Next, a description will be given of a method in which the amount of calculations of DCT partial product sum is minimized according to these principles. First, FIG. 3 shows a binary expansion values of seven cosine constants g(i) up to the 16-th digit. Also shown are the canonical recode values (the number of non-zero coefficients is changed from 59 to 42 through the recoding process). However, −1 is represented by applying an overline to 1. Additionally, since g(4) multiplied by the square root of two results in a simple value of one, there are also shown the results obtained by multiplying the constants by the square root of two (the number of non-zero coefficients is changed from 46 to 43). As above, applying an appropriate fixed value to the cosine constant, the number of non-zero coefficients is increased or decreased after the recoding process, and hence existence of an optimal solution can be expected. This naturally depends on the number of figures assumed. In this case, considering also the inverse DCT calculation (inversely, the constant is divided in the IDCT by the fixed value used in the multiplication) since the digit place can be easily aligned through the shift operation, it can be noted that either one of g(i) and the result obtained by multiplying g(i) by the square root of two is significant. However, this is not the case if either the DCT calculation or the IDCT calculation is utilized. In this embodiment, description will be primarily given on the assumption that the value is multiplied by the square root of two.

Figure 5:
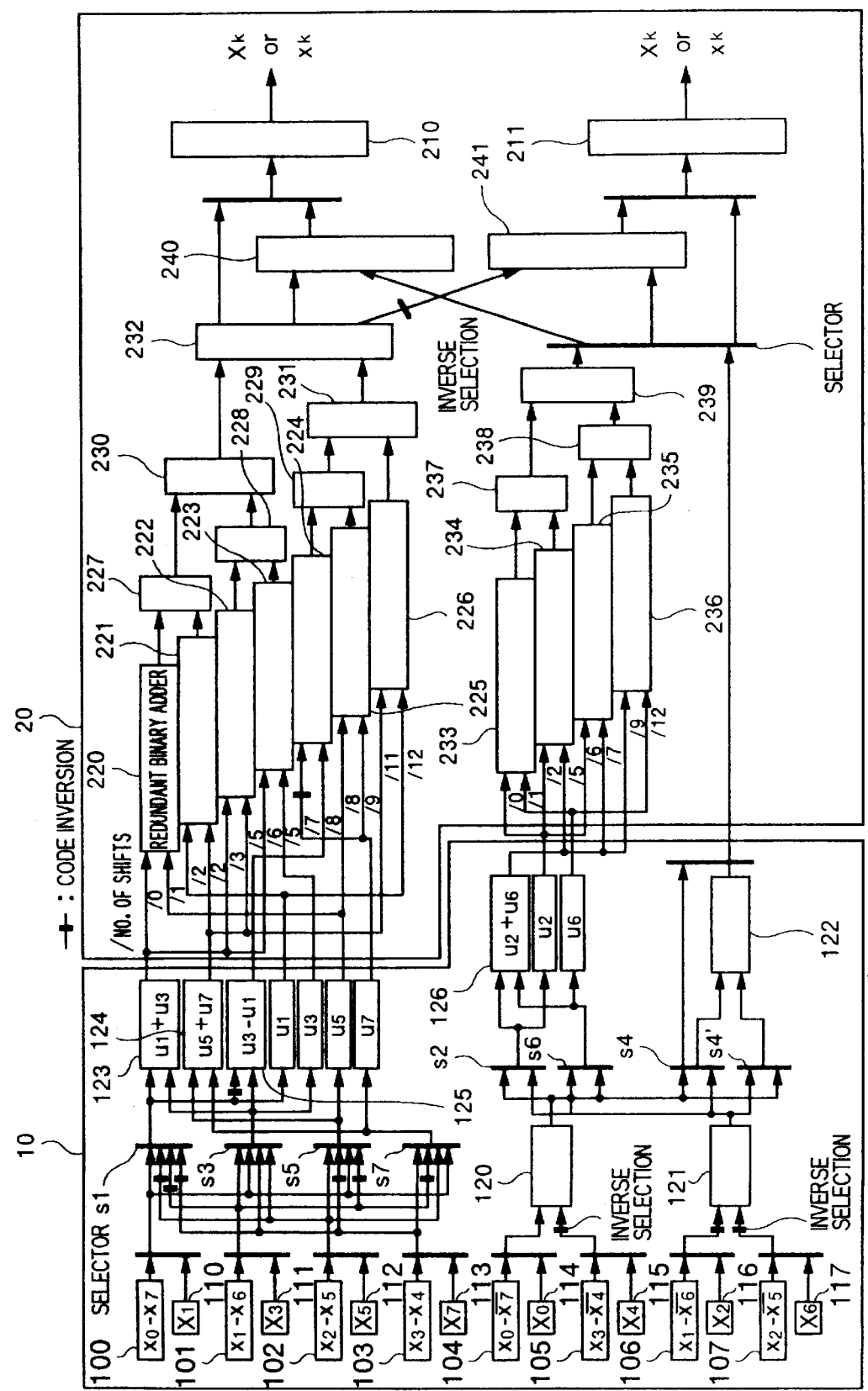
FIG. 5 is a circuit diagram for the calculation of the one-dimensional DCT/IDCT of the present invention.

In the DCT calculation, g(2k+1) and g(2k) are grouped, namely, to appear respectively in an odd-numbered row and an even-numbered row as shown in FIG. 2. Furthermore, since g(k) appears as having the opposite sign in columns i and j, the difference $u_k = x_i - x_j$ is beforehand calculated between $x_i$ and $x_j$. In this connection, for example, assuming $u_1 = x_0 - x_7$, $u_3 = x_1 - x_6$, $u_5 = x_2 - x_5$, and $u_7 = x_3 - x_4$ in the first row, the total sum $u_1 \cdot g(1) + u_3 \cdot g(3) + u_5 \cdot g(5) + u_7 \cdot g(7) =$ =1. 011000110001$u_1$+1. 001011010000$u_3$+0. 110010010010$u_6$+0. 010001101010$u_7$ (rounded up at the 13-th digit below the decimal point) is calculated as follows. First, as shown in FIG. 4, $u_1+u_3$, $u_1-u_3$, and $u_5+u_7$ are calculated in the prior addition. Thereafter, a shift and input process is carried out for the results of additions and for the digit places of appearances respectively of $u_1$, $u_3$, $u_5$, and $u_7$, thereby achieving the posterior addition for these items at once. Next, assuming $u_2 = (x_0+x_7)-(x_3+x_4)$ and $u_6 = (x_1+x_6)-(x_2+x_5)$ in the second row, the total sum $u_2 \cdot g(2) + u_6 \cdot g(6) =$ 1. 0100111010000$u_2$+0. 100010101001$u_6$ is calculated as follows. First, as shown in FIG. 4, $u_2$ and $u_6$ are obtained to be added to each other in the anterior addition. Thereafter, a shift and input process is carried out for the results of additions and for the digit places of appearances respectively of $u_2$ and $u_6$, thereby achieving the posterior addition for these items at once. In addition, for the 0-th and 4-th rows, assuming $u_4 = (x_0+x_7)+(x_3+x_4)$ and $u_4' = -(x_1+x_6)-(x_2+x_5)$, it is only necessary to first calculate $u_4$ and $u_4'$ to obtain the total sum $(u_4+u_4') \cdot g(4) = u_4+u_4'$. For the remaining rows, i.e., rows 3 and 6 and rows 5 and 7, the additions can be achieved by a configuration substantially similar to that used for the first and second rows. In this situation, providing selectors s1, s3, s5, s7, s2, s3, s4, and s4' as shown in FIG. 5, the hardware of the adder section can be commonly used such that the calculation is sequentially achieved for each of the odd-numbered rows and for each of the even-numbered rows. It is to be appreciated that the hardware of the adder section is not commonly utilized, but may be disposed in a parallel fashion. That is, to concurrently calculate the total sum for each row of the matrix representation shown in FIG. 2, adder hardware is independently arranged for each row.

Figure 6:
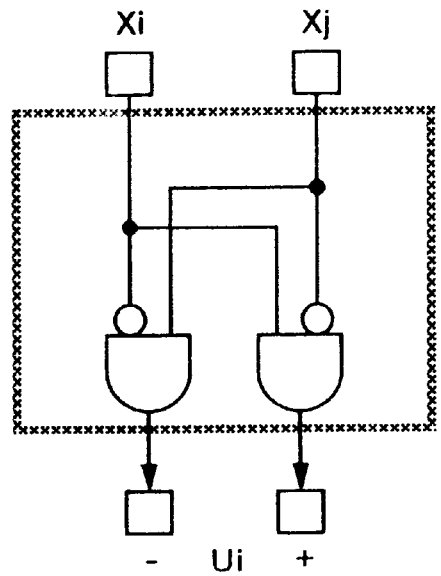
FIG. 6 is a one-digit circuit diagram for implementing $x_i - x_j$ by use of simple gates in place of adders.
Figure 7:
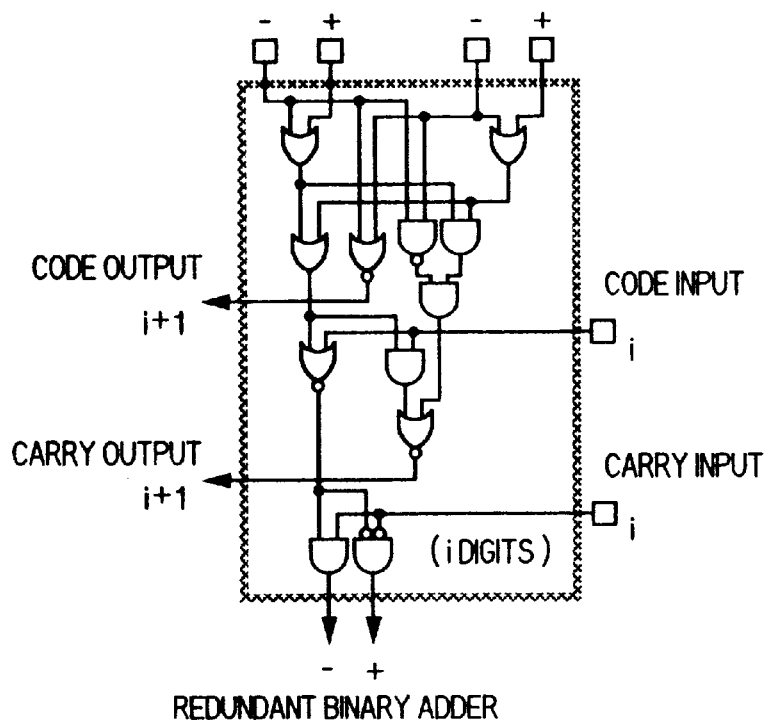
FIG. 7 is a one-digit circuit diagram of a redundant binary adder employed according to the present invention.
Figures 8, 9:
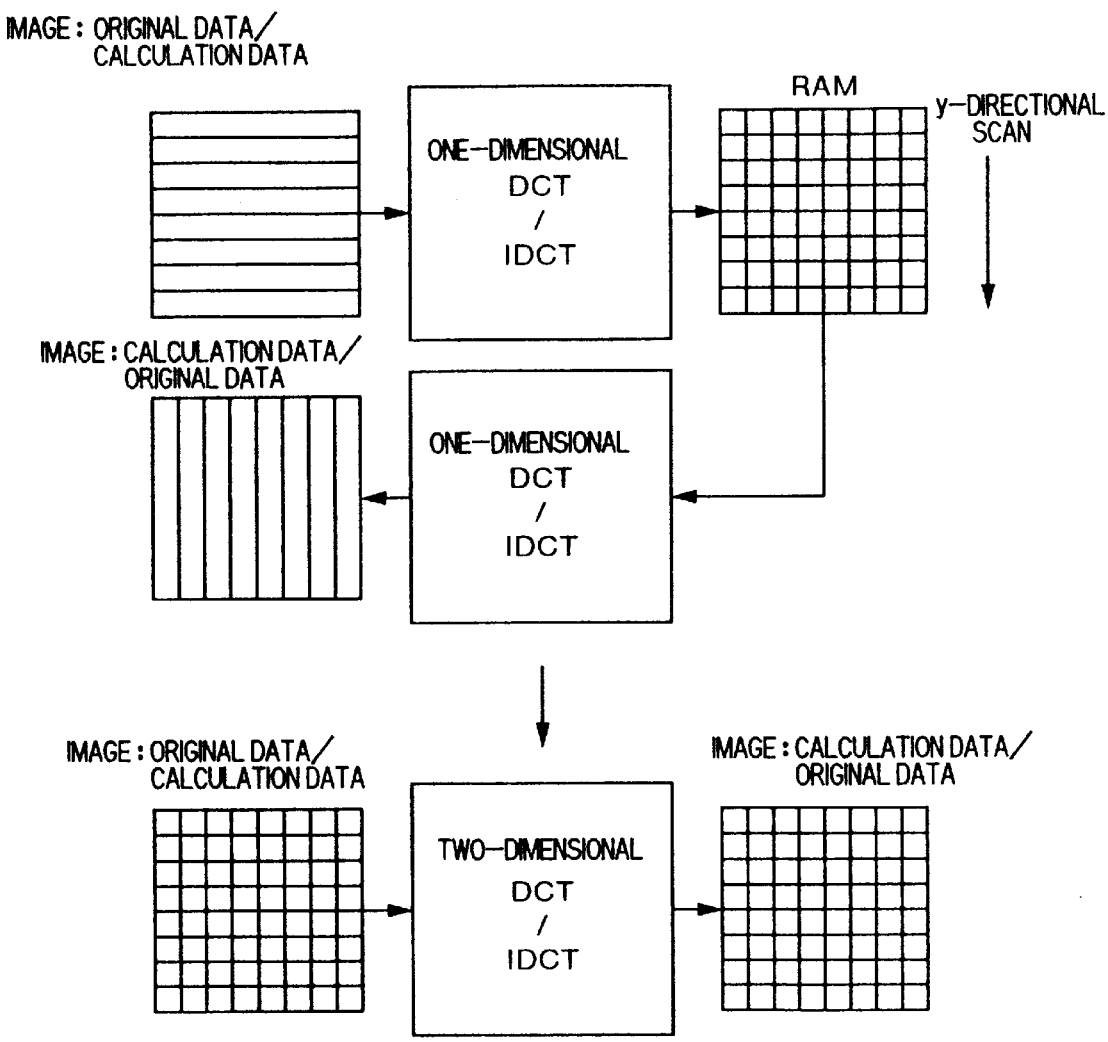
FIG. 8 is an explanatory diagram of a method of achieving the two-dimensional DCT/IDCT by reducing the two-dimensional form into a one-dimensional form and a method of directly calculating the two-dimensional DCT/IDCT.
FIG. 9 is a table showing binary expansion values of $\cos \alpha \times \cos \beta$ at two-dimensional points, i.e., 4×4 points and recoded values thereof.

In FIG. 5, it is only necessary to appropriately select the type of adders 120 to 126 and 220 to 241, for example, a full adder and carry-propagation-free adder may be chosen for each adder. To particularly increase the processing speed, a carry-propagation-free adder should be selected. In such a case, there is required sections 210 and 211 to transform the result of total sum into a binary representation. Moreover, the carry-propagation-free adders are classified into a carry save type and a redundant binary type. Either of these types may be used. In relation to this embodiment, a description will now be given of a circuit construction method adopting a characteristic unique to the redundant binary adder. Since the carry-propagation-free adder includes the same circuit for each digit place, it is only necessary to consider the circuit for an arbitrary digit position. First, since the calculation circuits 100 to 103 for $u_k = x_i - x_j$ associated with the respective digit places conduct operations of 0−0=0, 0−1=−1, 1−0=+1, and 1−1=0, the system can be configured with simple gate circuits shown in FIG. 6 without using any adder circuit. For the calculation circuits 104 to 107 for $u_k = x_i - x_j$, it is only necessary to consider $u_k = x_i + x_j = x_i - (-x_j)$. The value of $-x_j$ can be obtained through {(inverted $x_j$)+1} using the representation of two's complement. The inverted value of $x_j$ is represented by an overline applied to $x_j$. Since the additions in the second and subsequent stages are the redundant binary representation of {+1,0,−1}, the circuit shown in FIG. 7 is employed as the redundant binary adder circuit for each digit place. The result of the total sum obtained in the redundant binary representation is converted into a binary value. Since a redundant binary value can be decomposed into positive and negative binary values, the converter circuits 210 and 211 can be easily constituted with subtracters. The subtracter may be provided with a dedicated borrow-look-back circuit which corresponds to a carry-lookahead circuit in an adder.

Next, the IDCT calculation will be described. As shown in FIG. 2, the IDCT is attained by transposing the rows and columns of the DCT in the matrix representation. The difference therebetween resides in that the g(k) appearances are grouped according to odd and even values of k in DCT, but g(k) occurs for all values of k in the DCT. However, while g(1), g(3), g(5) and g(7) appear in the 0-th column, the same items with the opposite sign occur in the seventh column. In 0-th and seventh columns, g(4), g(2), g(4), and g(6) respectively appear with the same sign. Additionally, while g(3), −g(7), −g(1), and −g(5) occur in the first column, the same items with the opposite sign appear in the sixth column. In first and sixth columns, g(4), g(6), −g(4), and −g(2) respectively appear with the same sign. While g(5), −g(1), g(7), and g(3) occur in the second-column, the same items with the opposite sign appear in the fifth column. In second and fifth columns, g(4), −g(6), −g(4), and g(2) respectively appear with the same sign. In addition, while g(7), −g(5), g(3), and −g(1) occur in the third column, the same items with the opposite sign appear in the fourth column. In the third and fourth columns, g(4), −g(2), g(4), and −g(6) respectively appear with the same sign. In consequence, for the total sum of the grouped values of g(k)

related to an odd number of k, by effecting addition of the values having opposite signs for the preceding and succeeding columns, the IDCT results can be attained for two columns at the same time. Adding the circuits 240 and 241 and selectors thereof and the selectors of input data items 110 to 117 to FIG. 5, the hardware of the DCT/IDCT circuit can be commonly used.

Arranging the DCT/IDCT block diagram of FIG. 5 described above for each row of FIG. 2 in a parallel fashion for each calculation, there is provided the configuration diagram of FIG. 1 showing the discrete cosine high-speed arithmetic unit of the present invention. In short, eight original/calculation data items are simultaneously inputted to the arithmetic unit. In an anterior adder section 10, there are beforehand calculated the sums of and/or differences between the input data items (through the recoding process of cosine constant values) and the sums of and/or differences between the values obtained by multiplying the input data items by a fixed value (through the position shift operation of cosine constant values). Next, in the posterior adder section 20, the resultant values from the anterior adder section 10 are shifted for the alignment to a predetermined digit position to be then inputted to the group of adders, thereby calculating partial products. Obtaining the total sum of the partial products, eight output (calculation/original) data items are simultaneously obtained. In the conventional multiplier-based system, there are required 12 multiplications (11×12=132 additions) and 29 additions. This requires 161 adders in total. Additionally, when one addition is denoted as one stage, there exist 14 stages of addition. According to the method of the present invention, there are required 116 (=29×4) adders in total and five stages of addition. In consequence, while decreasing the number of adders to about ⅔ of that of the conventional system, the processing speed can be advantageously increased to three times that of the conventional system.

The DCT/IDCT described above is related to one-dimensional calculations and is primarily adopted for the compression/decompression of voices. To apply the arithmetic unit to the compression/decompression of a two-dimensional image expressed with coordinates (x,y), the image is decomposed into two one-dimensional elements associated with x-directional and y-directional scans. Namely, the results of first one-dimensional elements related to the x-directional scan are provisionally stored in a random access memory (RAM). The rows and columns are transposed to be inputted to second one-dimensional elements related to the y-directional scan for the calculation. The obtained results are related to the two-dimensional image. In contrast to the conventional method described above, description will be given of a method of the present invention in which the calculation is directly achieved in the two-dimensional manner without decomposing the image in the one-dimensional elements. For simplicity of explanation, description will be given of the two-dimensional case of 4×4 points. This will be easily expanded to a case of 8×8 points. In the two-dimensional case, constant values of cos α·cos β are required to be calculated. If the fixed values respectively of cos α and cos β are separately acquired for the calculation, multiplications will be required. However, in the case of 4×4 points, when the six combinations of the multiplied values are obtained in advance, the multiplications between the constants are unnecessary. Additionally, the storage operation of data in the RAM required in the conventional method in which the image is decomposed into two one-dimensional elements becomes unnecessary and hence the processing speed is increased. Assume f(i)=cos (πi/8). Then, the matrices of two-dimensional DCT and IDCT for 4×4 points are as shown in FIGS. 10 and 11. However, in this connection, the terms of coefficients which can be shifted are substantially unnecessary for the explanation and hence are not shown. Incidentally, matrix $F^t$ indicates a transposed matrix of matrix F.

Figure 13:
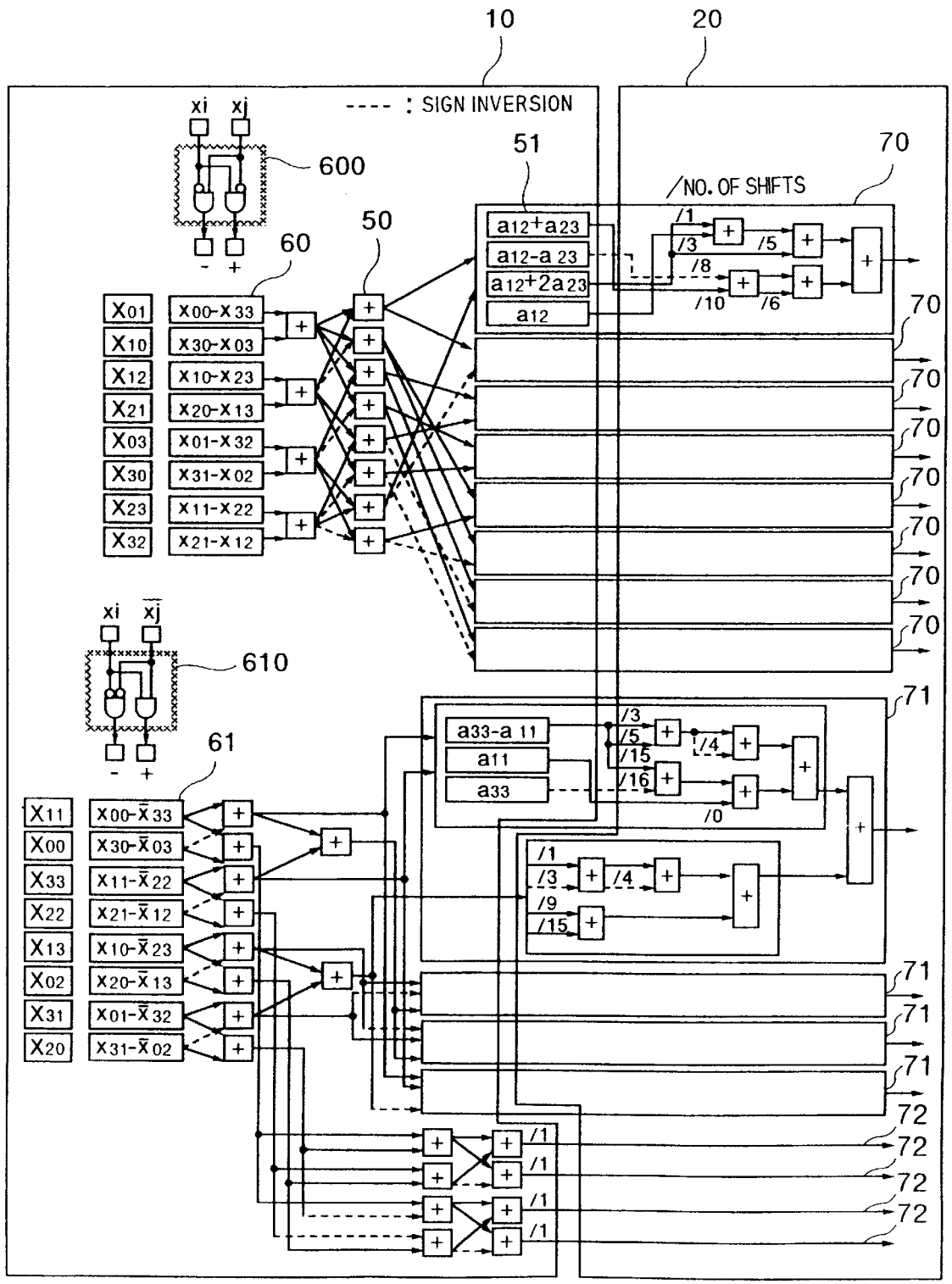
FIG. 13 is a circuit construction diagram of the present invention in which the DCT at two-dimensional 4×4 points is directly calculated without reducing the two-dimensional form into a one-dimensional form.

According to the expression of the two-dimensional DCT of FIG. 10, it can be seen from FIG. 12 that the values are attained up to the 16-th digit below the floating decimal point and the pairs of additions are attained as (f(1)f(2),f(2)f(3)) and (f(1)f(1),f(3)f(3)), and the single addition is as f(1)f(3) and f(2)f(2). As in the one-dimensional case, there are selected pairs of additions for the anterior addition and the results are subjected to a shift and input process according to the associated digit places so as to be added to each other at a time in the posterior addition 20. FIG. 13 briefly shows the block diagram of the two-dimensional DCT for 4×4 points. In this situation, all data items are assumed to be calculated in a parallel manner. Therefore, 4×4=16 data items Xij are stored beforehand in buffer memories or registers. The calculation of $x_{ij}-x_{kl}$ 60 is carried out by gates (for one digit position) of a circuit 600 without using any adder. The calculation of $x_{ij}+x_{kl}$ 61 is performed by gates (for one digit position) of a circuit 610 without using any adder. However, such adders utilized thereafter as adders 50 and 51 are redundant binary adders of which a one-digit circuit is as shown in FIG. 7. The additions in the group of adders are classified into three types 70 to 72 and there exist 16 blocks in total. Since the equation of the two-dimensional IDCT for 4×4 points is as shown in FIG. 11, the hardware of the DCT can be commonly used in a method similar to that applied to the one-dimensional case. According to the method of the present invention, since the two-dimensional item need not be decomposed into two one-dimensional elements, it is unnecessary to store the temporal data items in the transposing RAM, leading to an advantage that the calculation is executed without interruption and the processing speed is increased. However, the number of adders required is increased to about three times that used in the case in which the one-dimensional decomposing operation is effected.

Figure 14:
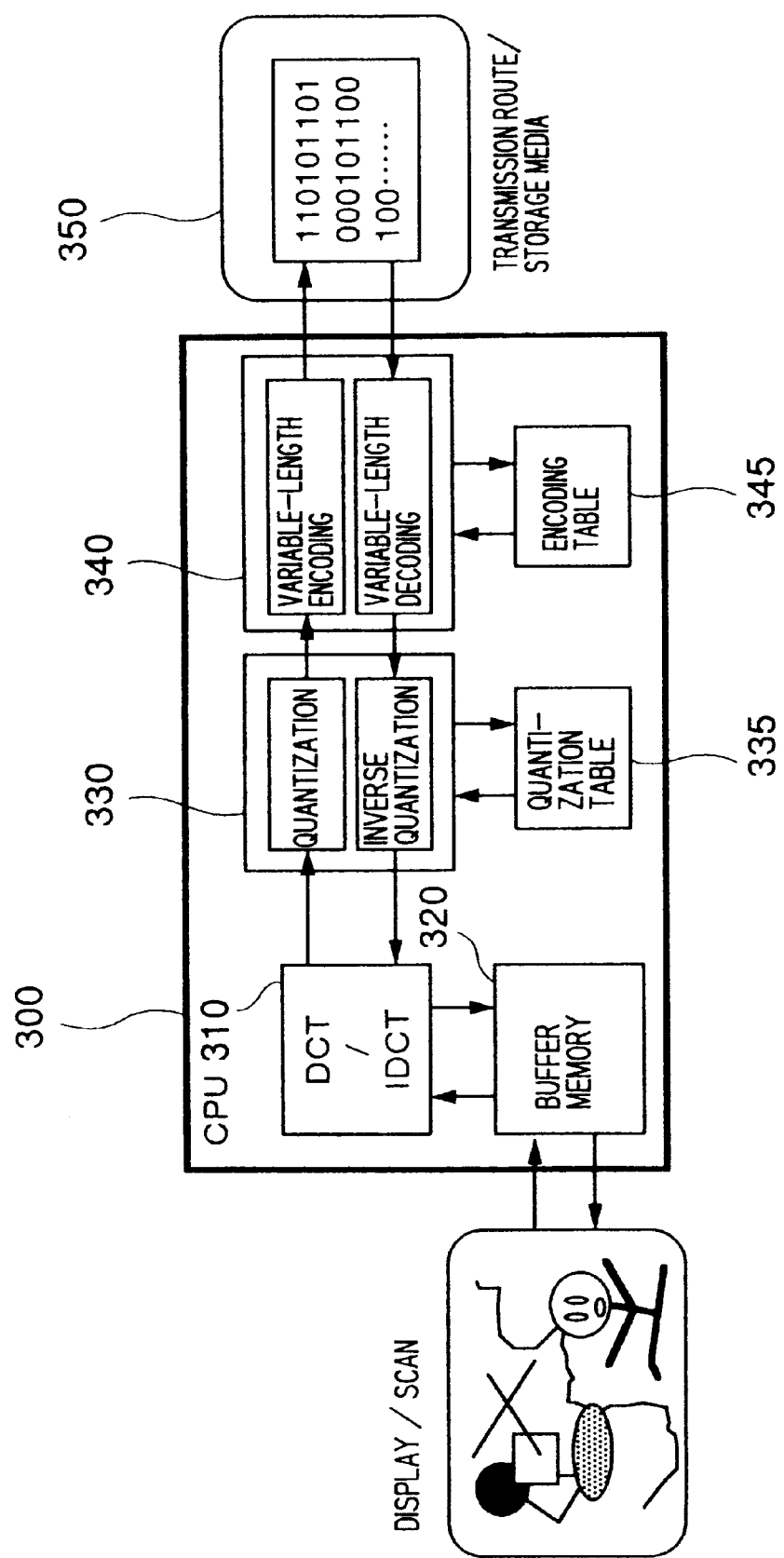
FIG. 14 is a configuration diagram of a chip in which a DCT/IDCT high-speed arithmetic unit of the present invention is incorporated.

FIG. 14 shows an example of a chip system 300 adopting the DCT/IDCT high-speed arithmetic unit of the present invention. An image is stored in a buffer memory section 320 such as a frame memory or a register in which a parallel access operation can be achieved. A DCT/IDCT section 310 simultaneously obtains all data items including 8×8=64 data items necessary for the operation and then outputs results of the operation to a quantizing section 330. The data is then compressed by a variable-length encoding section 340 to be sent to a transmission route or stored on a storage media (350). Conversely, compressed data supplied from the transmission route or storage media to the system 300 is decompressed by a variable-length decoder section 340. The data is then restored into the original calculation data by an inverse quantizing section 330 to be inversely transformed by IDCT 310 into the original image data. The image data is displayed as a picture via the buffer memory 320.

Description will now be given of a 16-point discrete Hartley transform (DHT). Assuming input data and calculation data to be $x_k$ and $X_n$, the expression of the DHT is represented by equation (10). Moreover, the inverse equation is represented by equation (11).

$$X_n = \sum_{k=0}^{15} x_k \cdot \text{cas}\frac{2\pi nk}{16} \tag{10}$$

where, $$x_k = \frac{1}{16}\sum_{n=0}^{15} x_n \cdot \text{cas}\frac{2\pi nk}{16} \tag{11}$$

$$\text{cas}\theta = \cos\theta + \sin\theta \tag{12}$$

Since equations (10) and (11) are of the same form when the multiplication of 1/16 (easily implemented by a shift operation) is ignored, only equation (10) will be described in the following paragraphs. Using the equation (13) shown below, equation (10) can be represented in matrix notation as shown in FIG. 16. Moreover, the rows and columns of the matrix notation of FIG. 16 can be rearranged as shown in FIG. 17.

$$p=\cos(\pi/8)+\sin(\pi/8)=\cos(\pi/8)+\cos(3\pi/8),\ q=\cos(5\pi/8)+\sin(5\pi/8)=\cos(3\pi/8)+\cos(\pi/8) \tag{13}$$

Description will next be given of a method in which the amount of calculations of product sums is reduced in the DHT according to the principles of equations (4) to (9) described above.

Figure 17:
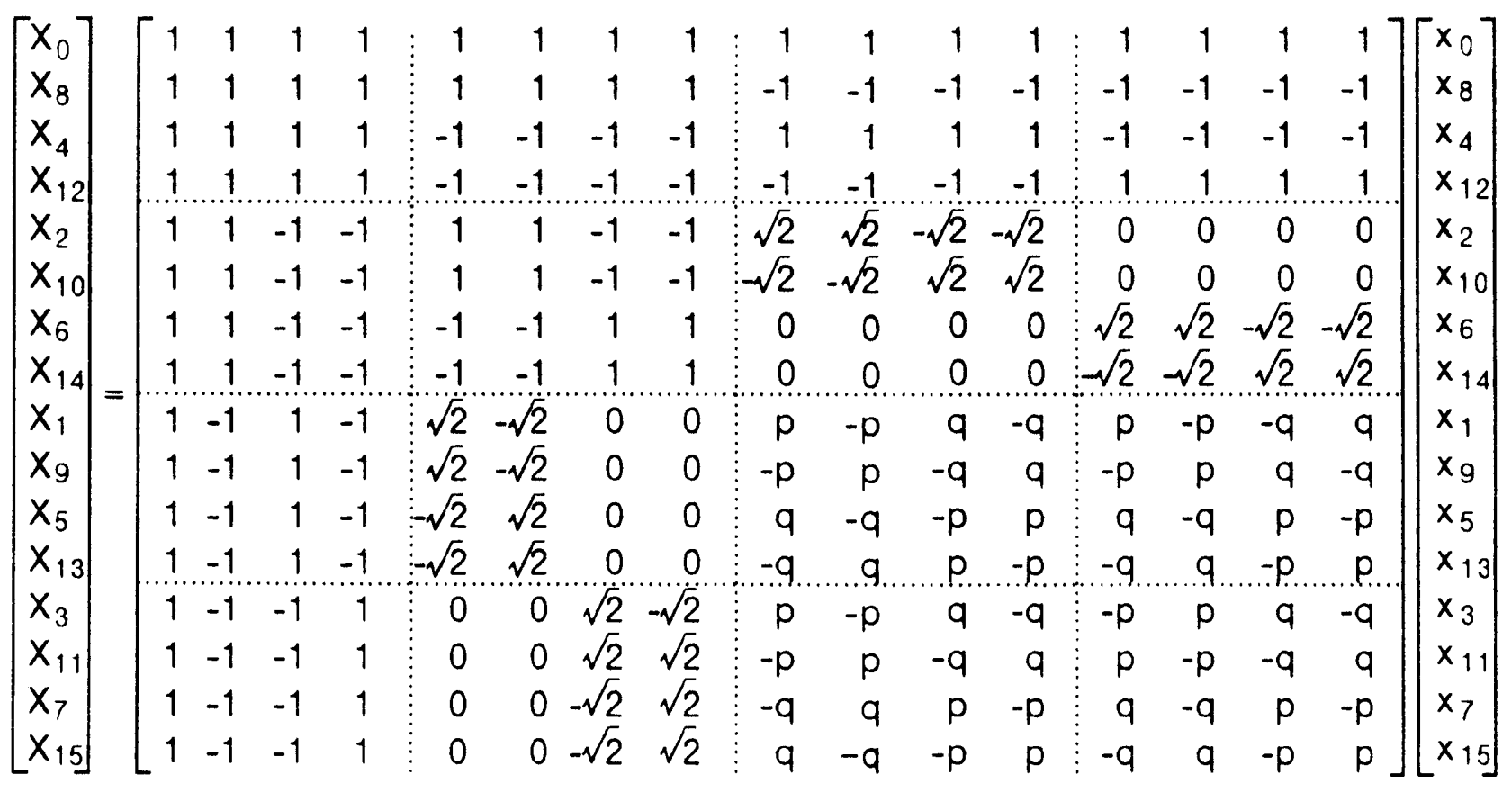

In the calculation of a DHT, the values of p, q, and square root of two appear as multiplication terms in groups as shown in FIG. 17. Furthermore, since these items are of the opposite signs and occur in two or more columns il, . . . , ij, the sums of and differences between xil, . . . , xij and wk=xil± . . . ±xij are calculated beforehand in a systematic fashion.

Additionally, in relation to a row in which, for example, X1 is to be calculated, assuming
w1=x0−x8, w2=x4−x12, w3=x2−x10, w4=x1−x9, w5=x3−x11, w6=x5−x13, w7=x7−x15, and up=w4+w5, uq=w6−w7, the calculation of the total sum $$w1+w2+w3\cdot\sqrt{(2)}+up\cdot p+uq\cdot q$$

is classified into three calculation groups of w1+w2, w3·√(2), and up·p+up·q. Calculation of w1+w2 is accomplished by an adder 560, w3·√(2) is calculated by a multiplier 520, and up·p+up·q is effected by a product sum unit 570.

First, in the calculation of $$up\cdot p+uq\cdot q=up\cdot 1.0100111001111011+uq\cdot 0.1000101010001011$$

Figures 18, 19:
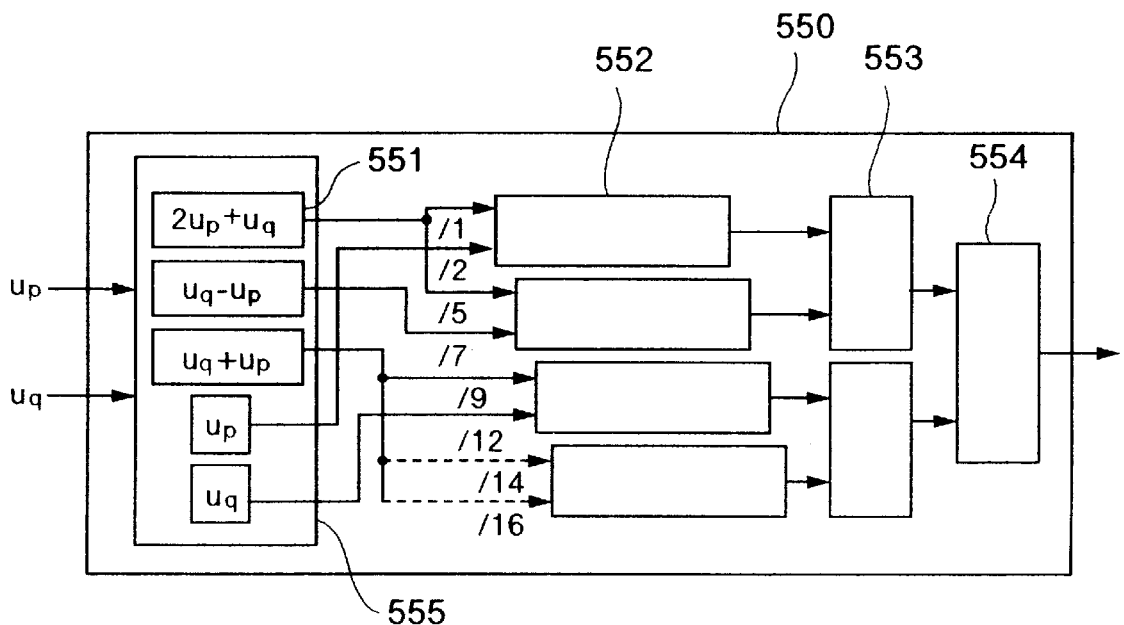
FIG. 18 is an explanatory diagram showing a state in which constants are developed into binary values.
FIG. 19 is a circuit block diagram showing a product sum circuit.

(rounded off at the 17-th digit below binary point), 2up+uq, uq−up, and uq+up are calculated in an anterior addition 555 and then a shift and input process is achieved for the results and digit places of occurrences of up and uq, thereby conducting posterior additions 552 to 554 for the resultant values at once as shown in FIGS. 18 and 19. In the calculation of W3·√(2)=w3·1.0110101000000101, w3 is shifted to be supplied to the digit position of occurrence of 1 so as to calculate the result by the group of adders (multiplier 520).

Figure 20:
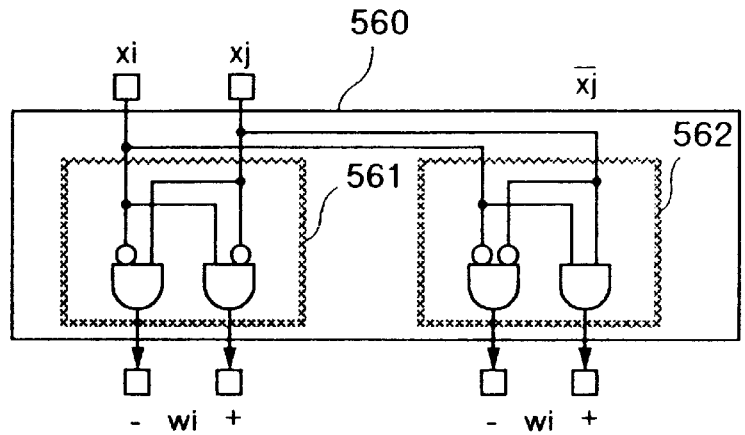
FIG. 20 is a circuit block diagram showing an initial stage of a butterfly arithmetic circuit.

First of all, the calculating circuit of each digit place of wk=xi−xj can be configured with simple gate circuits shown in FIG. 20 without using any adder circuit because the calculations are 0−0=0, 0−1=−1, 1−0=+1, and 1−1=0.

Figure 21:
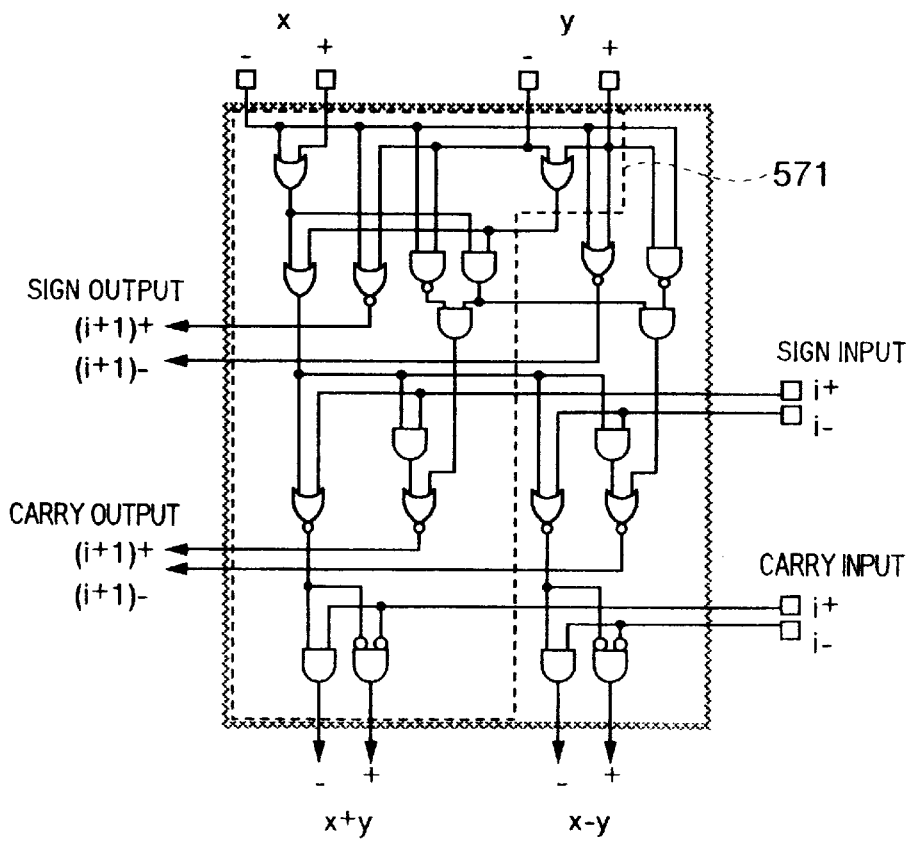
FIG. 21 is a circuit block diagram showing the second and subsequent stages of the butterfly arithmetic circuit.

The calculation circuit of each digit place of wk=xi+xj can be configured only in consideration of wk=xi+xi=xi−(−xj). The value of −xi can be attained by {(inverse value of xj)+1} according to the representation of two's complement. The inverse value of xj is represented by drawing an overline over xj. Furthermore, since the additions in the second and subsequent stages are the redundant binary representation of {+1,0,−1}, a basic circuit 571 shown in FIG. 21 is adopted as the redundant binary adder circuit for each digit place.

Moreover, in the Hartley transform circuit, the operation of xy, a so-called butterfly operation, is often conducted. Therefore, the gate configuration is partially shared between the arithmetic circuits of x+y and x−y to resultantly obtain a butterfly arithmetic circuit 570. The result of the total sum represented in the redundant binary representation is converted into a binary value. Since a redundant binary value can be decomposed into positive and negative binary values, the converter circuit can be easily constituted with subtracters. The subtracter may be provided with a borrow-lookback dedicated circuit which corresponds to a carry-lookahead circuit of an adder.

Figure 15:
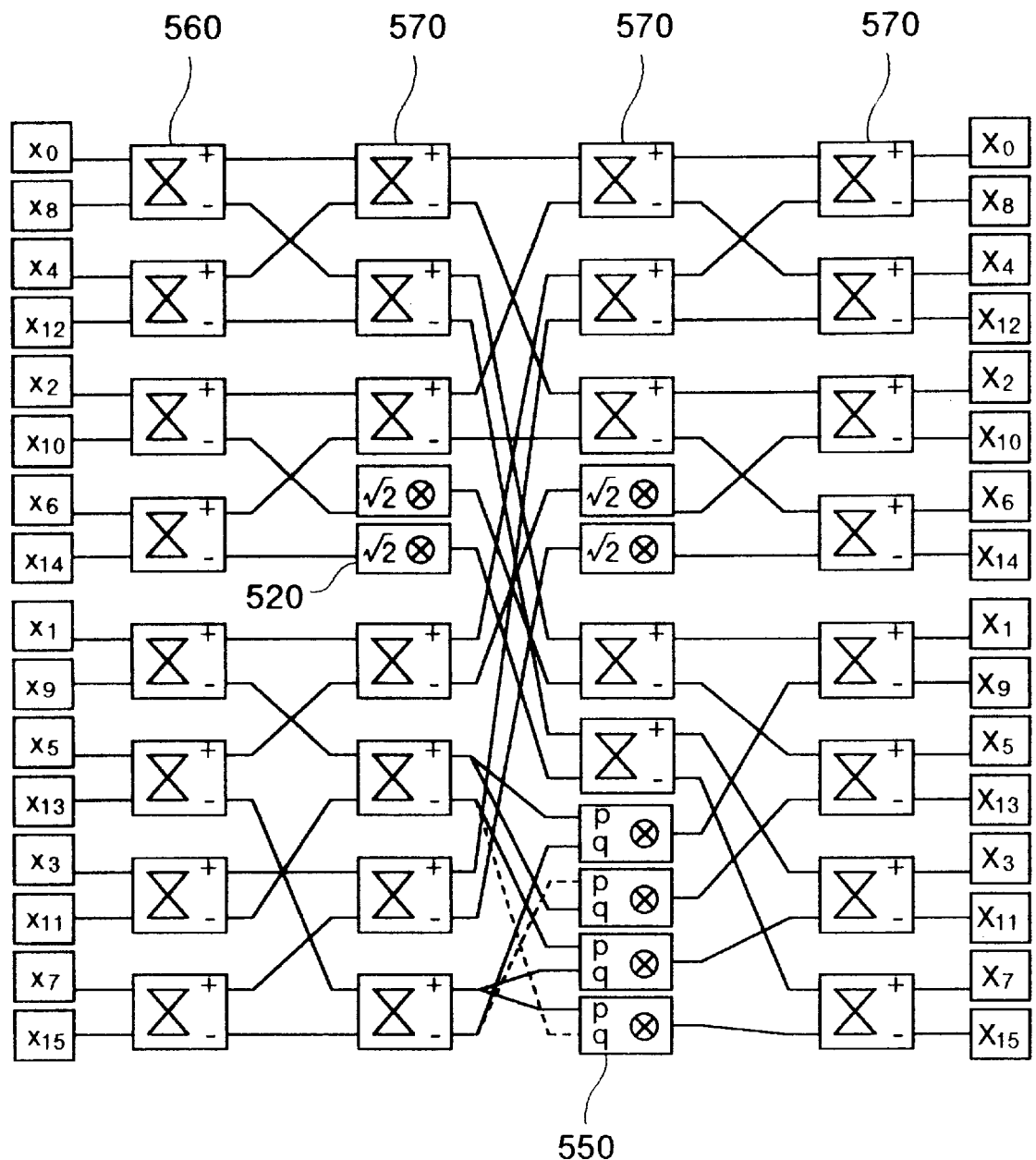
FIG. 15 is a construction diagram of a high-speed Hartley transform arithmetic unit as an embodiment of the present invention.

As a result of the description above, there is constructed a DHT arithmetic unit shown in FIG. 15. Assuming that 16 data items x0 to x15 are inputted thereto in a parallel manner, a butterfly operation is performed for the data items by eight circuits 560. Since the output therefrom is represented in redundant binary representation, the butterfly operations in the second and subsequent stages are accomplished entirely by the circuits 570. According to the groups shown in FIG. 17, the operation is subdivided into a portion including X0, X8, X4, and X12 in which the calculation is performed only by the group of butterfly arithmetic units, and a portion including X2, X10, X6, and X14 in which the calculation is carried out by a circuit 520 additionally disposed to multiply the square root of two by an input value thereto, and a portion Xi (i is an odd number) in which the calculation is executed by a circuit 550 added to the system.

The flow of calculation steps is as shown in FIG. 15, which requires the following arithmetic units including 28 butterfly arithmetic units, four multipliers 520, and four product sum units 550. When the calculation above is conducted by the conventional multiplier-based system, 15 adders are used in the multiplier, since two adders are necessary in the butterfly arithmetic unit and 31 adders are required in the product sum unit 550, it can be appreciated that 8×2+4×15+4×31=240 adders are required. In addition, when one addition is regarded as one stage, eight stages of addition are employed. In contrast therewith, according to the present invention, only 108 (=20×2+7×4+10×4) adders are necessary in total for each stage, and only six stages of addition are required. This consequently leads to an advantageous effect that while the number of adders is reduced to be equal to or less than half that of adders employed in the conventional system, the processing speed is increased to about 1.3 times that of the prior art. Since the number of multiplications is abruptly increased in a DHT for 32 points or more, the advantageous effect of the increased processing speed is much more enhanced.

Next, description will be given of a method in which the amount of calculations of partial product sum is decreased according to the principles of equations (4) to (9) already described above. Description will be given of the Hough transform in a case in which the angle θ is divided into 16 directions. Furthermore, only eight directions in the range of angle 0 to π/2 will be described. Since the minimization of the amount of calculations can be achieved by almost the same manner also for the remaining eight directions in the range of angle π/2 to π in which only the sign is partially changed, description thereof and a diagram related thereto will be omitted.

Prior to the realization of calculations of the Hough transform, consider first a formula of product sum represented by equation (14).

$$R = x \cdot C_x + Y \cdot C_y \quad (14)$$

Assuming now $$c_x = \sum_{i=0}^{m-1} c_{x,i} 2^i, \quad c_y = \sum_{i=0}^{m-1} c_{y,i} 2^i \quad (15)$$

the following equation results:

$$R = x \cdot c_x + y \cdot c_y = x \cdot \sum_{i=0}^{m-1} c_{x,i} 2^i + y \cdot \sum_{i=0}^{m-1} c_{y,i} 2^i \quad (16)$$

In the equations above, however, there is assumed a condition of cx, i, cy, i∈{−1,0,+1}. If there exists a pair of coefficients of cx, i and cy, p for which cx, i=|cy,p|=1, equation (17) results:

$$(x \cdot cx, i + y \cdot cy, p \cdot 2[-i]2i = x \pm y \cdot 2p - i)2^i \quad (17)$$

For the product sum of x·cx+y·cy, if there exist a plurality of pairs of coefficients which satisfy equation (17), the sums of and differences between x and y·2n (n=shifted by (p−i) digit places) are calculated according to the principle designated by equation (17) and then the resultant values are shifted respectively to the digit positions to satisfy the condition above so as to be added to each other, thereby decreasing the number of calculations of partial product sums.

In addition, appropriately employing the relationship of equation (18) called a canonical recoding in which i nonzero coefficients can be reduced to two non-zero coefficients, there are conducted shift operations to thereby increase the pairs of coefficients satisfying equation (17) as follows:

$$2^i - 2^0 = 2^{i-1} + 2^{i-2} + \ldots + 2^0 \quad (18)$$

Figures 23, 24:
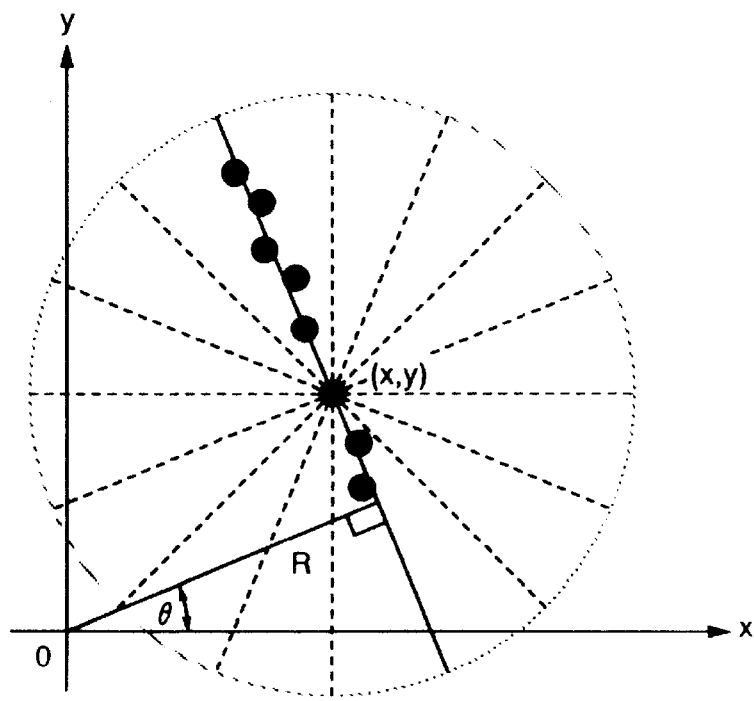
FIG. 23 is an explanatory diagram showing a geometric relationship of a 16-directional Hough transform.
FIG. 24 is an explanatory diagram related to a binary expansion of constant values of cosine functions and grouping of common parts.

FIG. 24 shows the recoded results of eight cos values (rounded off at the 17-th digit below binary point). Moreover, according to the relationship between the equation of the Hough transform and equation (17), the common pairs of x and y for the addition and subtraction can be arranged as enclosed in a rectangle in FIG. 24.

In a case of, for example, θ=3π/16, since R x cos(3π/16)+y cos(5π/16), the calculation can be conducted in groups of x+y for the first, fourth, and 14-th digit places below binary point, x−2y for the eighth and 11-th digit places below binary point, and x+2y for the 16-th digit place below binary point in the anterior addition. In addition, these anterior addition groups can also be commonly adopted for other values of θ. In the conventional method based on multipliers, the values of cos(3π/16) and cos(5π/16) stored in a table are read therefrom to be respectively multiplied by x and y. Consequently, the common anterior addition steps above have been impossible.

Values of R to be discretized are generated by an R decoder. Moreover, the R decoder is directly connected to a voting counter such that the value of the counter associated with votes is decoded and an operation of +1 is carried out. The R decoder and voting counter are arranged for each θ.

Figure 22:
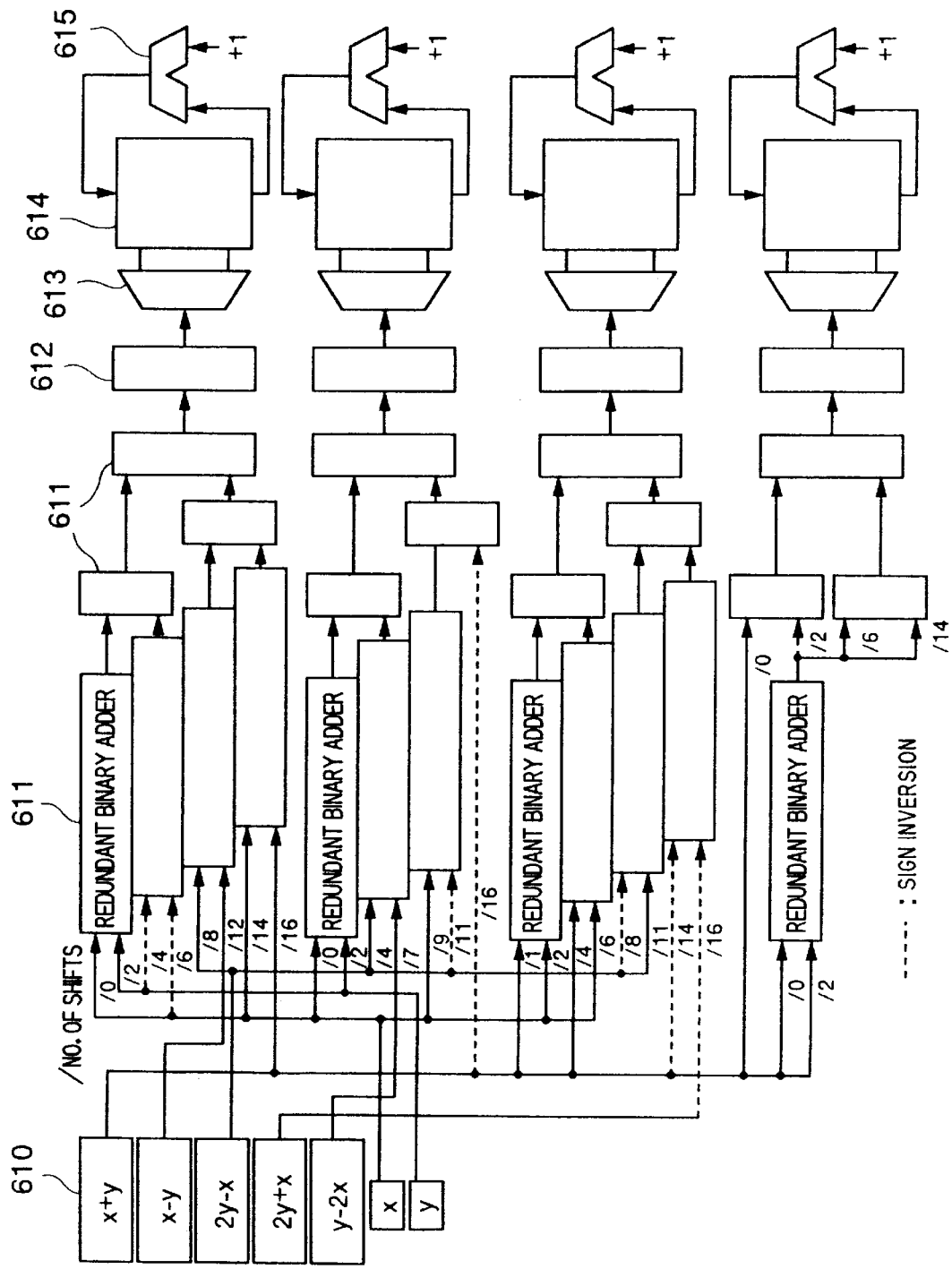
FIG. 22 is a construction diagram of a high-speed Hough transform circuit as an embodiment of the present invention.

As a result of the description above, there is configured the Hough transform circuit shown in FIG. 22. Assume that coordinate data (x,y) of an arbitrary pixel is inputted thereto. The data is subjected to additions and subtractions in the circuit 560. Since the outputs therefrom are represented in redundant binary representation, the operations in the second and subsequent stages are accomplished entirely by a circuit 571.

In the multiplier-based system of the prior art, since 15 adders are necessary for one multiplier (in a 16-bit processing system), there are required 8×(2×15+1)=248 adders. Additionally, when one addition is regarded as one stage, five stages of addition are used (under a condition that eight multipliers are adopted in parallel). According to the present invention, there are required in total only 24 adders including the circuit 571 (the adders of the circuit 560 are simple gates and are not included). Moreover, only four stages of addition need to be employed. Therefore, paying attention only to the Hough transform calculating section, there is attained an advantage that while reducing the number of adders to ⅒ or less as compared with the conventional system, the processing speed is increased to about 1.25 times that of the prior art. Furthermore, in accordance with the present invention, since the read operation of the coefficient table is unnecessary and the update of the voting counter is executed without interruption, it can be expected that the processing speed is actually increased to at least ten times that of the conventional system. In addition, since only one multiplier is adopted and/or adders with carry propagation are utilized in many usual cases, the processing speed can be expectedly increased to at least 1000 times that of the ordinary conventional cases.

As an application example of the present invention, there can be considered, for example, an application in which such items primarily including straight line components as Chinese characters are to be recognized. Moreover, in a case in which when the directions are fixed to about 16 directions, there can be possibly adopted a utilization mode in which the straight line components are first detected through a coarse detection step to be then sieved for a fine detection. The sieved pixels can be further processed for a precise determination of the direction such that the operation efficiently proceeds to the subsequent work processes. For the fine determination of direction, the system conducts calculation of equation (19) according to the addition theorem of trigonometric functions, $$R = x\cos\theta + y\sin\theta = x\cos(\alpha + \beta) + y\cos(\alpha + \beta) \quad (19)$$
$$= x(\cos\alpha\cos\beta + \sin\alpha\sin\beta) + y(\sin\alpha\cos\beta + \cos\alpha\sin\beta)$$
$$= (x\cos\alpha + y\sin\alpha)\cos\beta + (x\sin\alpha + y\cos\alpha)\sin\beta$$

where, α is an angle with the precision of 16 divisions and β indicates an angle with a finer division. Consequently, the calculation of equation (19) is precisely achieved using multipliers in a method similar to the conventional method. Assume X=(x cos α+y sin α) and Y=(x sin α+y cos α). It can be appreciated that these values can be immediately calculated by the hardware of the present invention.

The present invention is not limited to the discrete cosine transform and Hartley transform, but can be expanded generally to trigonometric functions. Therefore, the present invention is applicable also to the discrete Fourier transform and its associated operations (such as Wavelet transform). In addition, the present invention can be applied not only to general transforms using trigonometric functions, such as Hough transforms, but also to Radon transforms which are obtained by generalizing Hough transforms. Moreover, the trigonometric functions can be expanded to general periodic functions. Additionally, the application range can be expanded to a case in which either one of the operations is a product sum operation of constants. Dimensions can be increased from two dimensions to three or more dimensions, and the discretization points can be increased to more than eight. The shift operation of the present invention is fixed as a predetermined operation. When the system to conduct the shift operation is configured with shifters, there is obtained a variable construction and hence the application range is expanded. Although a large number of adders are employed, the basic circuit of an arbitrary one digit place has a regular repetitive structure and hence the design scale can be easily increased.

INDUSTRIAL APPLICABILITY

According to the present invention, there is attained an advantage that the number of gate stages is considerably reduced and the calculation speed is increased in the DCT/IDCT, Hartley transform, and Hough transform. Moreover, since the DCT/IDCT hardware is almost all commonly used, when the basic element is repeatedly used to hold (processing speed)×(area)=(constant) for the high-speed calculation, it is possible to minimize the chip area.

What is claimed is:

1. A computer system comprising:
a discrete cosine arithmetic unit for discrete cosine transform; and
a buffer memory connected to said discrete cosine arithmetic unit,
wherein said discrete cosine arithmetic unit includes:
a plurality of first units for calculating in parallel sums of a plurality of values obtained by multiplying a plurality of input variables by a constant and differences between said plurality of values; and
a plurality of shift units for shifting outputs from said plurality of first units by respectively predetermined number of digit-shifts;
a plurality of second units for calculating sums of outputs from said plurality of shift units.

2. A computer system according to claim 1,
wherein said plurality of first units includes selecting means for selecting, for an i-th column and a j-th column of n−1=i+j in a point discrete cosine transform formula, results of calculation of sums of and differences between data of said i-th column and said j-th column immediately after said data are inputted thereto in case of a transform of said n-point discrete cosine transform formula and for selecting the inputted data of an i-th row and a j-th row itself in case of an inverse transform of n−1=1+j in said n-point discrete cosine transform formula, whereby hardware is shared between said transform and said inverse transform of said n-point discrete cosine transform formula.

3. A computer system according to claim 1, including a plurality of gate circuits, each of which is a circuit for transforming a sum in an initial data inputting stage into a subtraction to achieve 1−1=0, 1−0=1, 0−1=−1, and 0−0=0, and redundant binary adders for subsequent additions of outputs from said plurality of gate circuits.

4. A computer system according to claim 1, wherein a plurality of cosine coefficients multiplied by an appropriate fixed value of a matrix of rows and columns for discrete cosine transform are beforehand multiplied by said appropriate fixed value so that the number of non-zero coefficients after a recoding operation of said plurality of cosine coefficients of said matrix of rows and columns for discrete cosine transform is less than that of initial coefficients which would result if said plurality of cosine coefficients of said matrix of rows and columns for discrete cosine transform were not multiplied by said appropriate fixed value.

5. A computer system according to claim 1, further comprising:

a quantizing unit connected to said discrete cosine arithmetic unit; and
an encoding unit connected to said quantizing unit.

6. A computer system according to claim 5, further comprising:
a display unit connected to said buffer memory; and
a storage media connected to said encoding unit.

7. A computer system according to claim 1, further comprising:
a quantizing unit connected to said discrete cosine arithmetic unit; and
an encoding and decoding unit connected to said quantizing and inverse quantizing unit.

8. A computer system according to claim 7, further comprising:
a display unit connected to said buffer memory; and
a storage media connected to said encoding and decoding unit.

9. A computer system comprising:
a discrete cosine arithmetic unit for discrete cosine transform; and
a buffer memory connected to said discrete cosine arithmetic unit,
wherein said discrete cosine arithmetic unit includes:
a plurality of first units for pre-calculating in parallel sums of a plurality of values obtained by multiplying a plurality of input variables by a constant and/or differences between said plurality of values; and
a plurality of shift units for shifting outputs from said plurality of first units by respectively predetermined number of digit-shifts;
a plurality of second units for post-calculating sums of outputs from said plurality of shift units.

10. A computer system according to claim 9, further comprising means for beforehand calculating sums of and/or differences between a plurality of variables and values obtained by multiplying the plural variables by a constant, shifting calculated results by predetermined numbers of digit places by directly using constants resultant from the multiplications between a plurality of constants, and conducting a plurality of calculations, thereby achieving an addition for the results at a time.

11. A computer system according to claim 10, further including means for selecting, for i and j of n−1=i+j in an n-point discrete cosine transform formula, results of calculation of sums and differences between an i-th column and a j-th column immediately after data is inputted thereto in a case of transform and selecting the data itself in a case of inverse transform and means for classifying calculations thereafter into calculation of odd-numbered rows and calculation of even-numbered rows and selecting immediately before outputting results sums of and differences between the results of the groups of the even-numbered and odd-numbered rows and the results themselves, characterized in that hardware is shared between the transform and the inverse transform.

12. A computer system according to claim 10, characterized by further directly including a gate circuit for transforming an addition in an initial stage into a subtraction to achieve 1−1=0, 1−0=1, 0−1=−1, and 0−0=0 and redundant binary adders for subsequent additions.

13. A computer system according to claim 10, wherein appropriate coefficients are beforehand multiplied by a constant so that the number of non-zero coefficients after a recording operation is less than that of the initial constants.

14. A computer system according to claim 9, further comprising a section to input and to output multimedia information of voice, image, code, and the like and a memory to buffer therein data of the multimedia information for conducting parallel input and output operations of data via the buffer memory, wherein operation of the data is performed by said discrete cosine high-speed arithmetic unit.

15. A computer system according to claim 14, wherein said data operations are performed in a realtime fashion to virtually provide a storage capacity which is larger than an actual storage capacity thereof by two to three orders of magnitude.

16. A computer system according to claim 9, further comprising means for beforehand calculating sums of and/or differences between a plurality of variables and values obtained by multiplying the plural variables by a constant, shifting calculated results by a predetermined numbers of digit places by directly using a constant result determined as one constant by beforehand conducting calculation between a plurality of constants, and conducting a plurality of calculations, thereby achieving an addition for the results at a time.

17. A computer system comprising:
   a discrete cosine arithmetic unit for inverse discrete cosine transform; and
   a buffer memory connected to said discrete cosine arithmetic unit,
wherein said discrete cosine arithmetic unit includes:
a plurality of first units for calculating in parallel sums of a plurality of values obtained by multiplying a plurality of input variables by a constant and differences between said plurality of values; and
a plurality of shift units for shifting outputs from said plurality of first units by respectively predetermined number of digit-shifts;
a plurality of second units for calculating sums of outputs from said plurality of shift units.

18. A computer system comprising:
   a discrete cosine arithmetic unit for inverse discrete cosine transform; and
   a buffer memory connected to said discrete cosine arithmetic unit,
wherein said discrete cosine arithmetic unit includes:
a plurality of first units for pre-calculating in parallel sums of a plurality of values obtained by multiplying a plurality of input variables by a constant and/or differences between said plurality of values; and
a plurality of shift units for shifting outputs from said plurality of first units by respectively predetermined number of digit-shifts;
a plurality of second units for post-calculating sums of outputs from said plurality of shift units.

* * * * *